Figure 1:
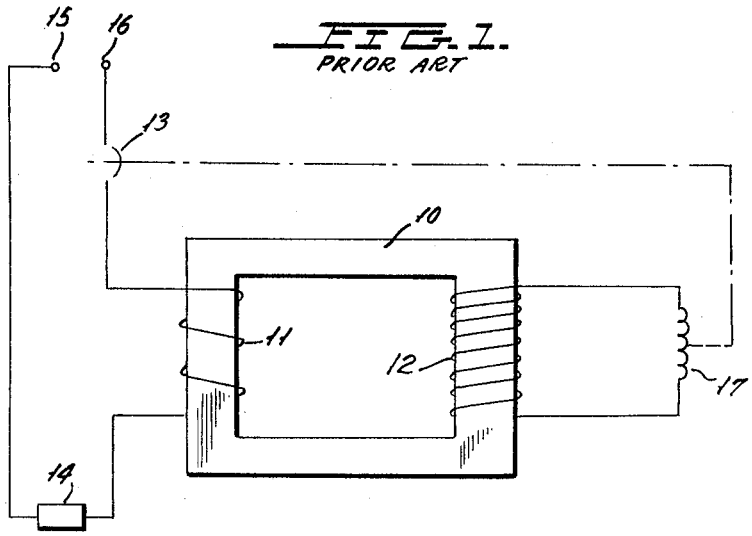

Oct. 18, 1966  O. JENSEN  3,280,375
TRIPPING DEVICE
Filed Jan. 17, 1963

INVENTOR.
OTTO JENSEN
BY
OSTROLENK, FABER, GERB & SOFFEN
ATTORNEYS

United States Patent Office 3,280,375
Patented Oct. 18, 1966

3,280,375
TRIPPING DEVICE
Otto Jensen, Malvern, Pa., assignor to I-T-E Circuit Breaker Company, Philadelphia, Pa., a corporation of Pennsylvania
Filed Jan. 17, 1963, Ser. No. 252,204
2 Claims. (Cl. 317—58)

My invention relates to a novel tripping device and more specifically relates to a tripping device which can be rendered operative or inoperative at some discrete current magnitude other than zero current to thereby accurately establish a definite calibration point in which currents above or below this calibration point will cause a change in state of a magnetic path.

Tripping devices such as those used in circuit breakers are well-known to the art which respond to abnormally high currents through a circuit protected by the circuit breaker. A typical tripping device includes a current transformer having its primary winding in the main circuit protected by the circuit breaker and a secondary winding connected to a relay or trip coil of the circuit breaker. Therefore, when the current in the primary circuit reaches a value at which it is desired to trip the circuit breaker, this value will be reflected in the secondary winding and thus operate the tripping device, which will trip the circuit breaker.

In such systems, it is difficult to accurately establish a calibration point for the current transformer or a value of current above which the device will operate and below which it will not operate. Thus, it is found in some cases that currents below the predetermined threshold level will cause the device to perform an undesired operation.

The principle of the present invention is to provide a novel tripping device of the current transformer type wherein the magnetic circuit of the current transformer is established only when a predetermined current flows through the primary winding so that it is impossible to transform currents into the secondary winding of the current transformer until this value is reached. Once this value is reached, however, currents are directly transformed between the primary and secondary circuits so that a definite accurate tripping pulse is established. That is to say, where the device is calibrated so that the magnetic circuit is closed when a predetermined current is established, the device is positively non-operative at currents below this value and positively operative above this current value. Moreover, it is possible to very accurately calibrate the system to permit physical movement of a magnetic core component with a high degree of accuracy whereby the calibration point may be accurately established. By way of example, one part of the closed iron core of the current transformer may be movable with respect to the main portion of the core and biased to a large air gap position by appropriately calibrated restraining springs or by gravity. The magnetic system is then so designed that when an appropriate primary current flows through the primary winding, a sufficient force will be applied to the movable element or armature to close the normally open air gap against the force of the restraining means and complete the magnetic circuit. Thus sufficient flux can now link the primary winding and secondary winding so that a substantial current is induced in the secondary winding.

Accordingly, a primary object of this invention is to provide a novel circuit breaker trip structure.

Another object of this invention is to provide a novel tripping device which has a sharply defined calibration point.

A further object of this invention is to provide a novel transducing electrical device.

Another object of this invention is to provide a novel electrical transformer which has a movable core portion therein for permitting the closing of the transformer magnetic circuit only when a predetermined current flows in the primary winding thereof.

These and other objects of this invention will become apparent from the following description when taken in connection with the drawings, in which:

FIGURE 1 illustrates a typical prior art current transformer arrangement as the trip sensing device of a circuit breaker.

Figure 2:
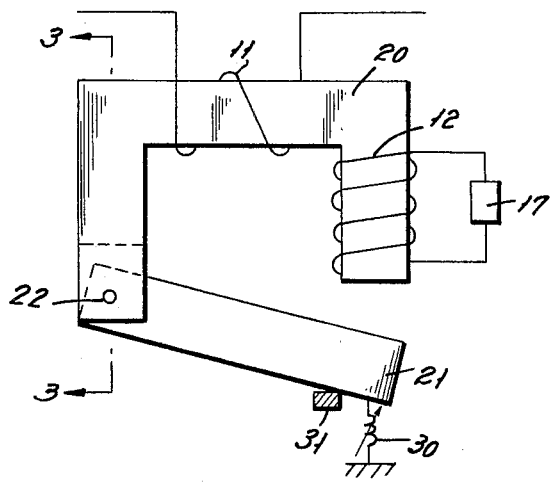

FIGURE 2 schematically illustrates the novel trip sensing device of the present invention.

Figure 3:
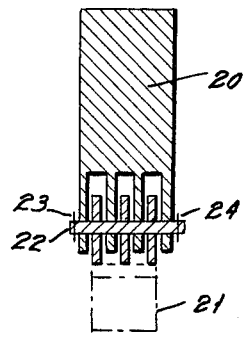

FIGURE 3 is a cross-sectional view of the FIGURE 2 when taken across the line 3—3 in FIGURE 2.

Referring first to FIGURE 1, I have illustrated therein a current transformer which is comprised of a magnetic core 10, a primary winding 11, and secondary winding 12.

As schematically illustrated, the primary winding 11 is connected in series with a circuit interrupter 12, a load 14, and a pair of terminals 15 and 16 which are connected to an appropriate A.-C. voltage source. The secondary winding 12 is then connected to an appropriate tripping device or relay coil 17 which, in turn, controls the operation of circuit breaker 13 as schematically illustrated by the dotted line interconnecting coil 17 and breaker 13. In operation, and so long as the current through circuit breaker 13 and primary winding 11 is below some predetermined value the current induced in winding 12 and thus applied to tripping device 17 is insufficient to cause an opening operation of circuit breaker 13. When, however, the current and winding 11 exceeds some predetermined value, then the increased current in winding 12 will cause operation of circuit breaker 13.

The difficulty with such systems lies in the difficulty of causing an operation at one current while preventing the operation at a slightly decreased magnitude of current. That is to say, it is difficult to provide some definite calibration point at which the circuit breaker 13 will be operated.

The principle of the present invention is illustrated in FIGURES 2 and 3 and provides extremely accurate calibration by mechanical forces outside of the electrical system.

Referring now to FIGURES 2 and 3, where components similar to those of FIGURE 1 have been given similar identifying numerals, the current transformer is altered to have a main iron core portion 10 and an armature portion 21. The main core portion 10 recives the primary winding 11 and secondary winding 12 as illustrated in FIGURE 1 wherein the secondary winding 12 is connected to an appropriate operating structure such as the relay coil 17 of FIGURE 1 or any structure equivalent thereto.

The armature 21 is pivotally mounted to core 20 by the pivot pin 22 which could have clips 23 and 24 at its open ends as illustrated in FIGURE 3 to retain pin 22 in position.

As best illustrated in FIGURE 3, core 20 and armature 21 may have comb-like portions which interleave with one another to provide a large area air gap at the pivot portion of the current transformer core. Appropriate washers (not shown) may be provided to permit low friction pivotal engagement between armature 21 and core 20. Clearly, any desired structure can be provided for pivotally supporting the armature 21 with respect to core 20. Moreover, a pivot arrangement is not necessary, it only being necessary that the armature 21 is movable from a large air gap position to a low air gap position with respect to core 20.

An accurately calibrated and adjustable spring 30 can be attached to the end of armature 21 to exert some predetermined adjustable biasing force on the end of armature 21 to hold it in engagement with the stop 31. Any other desired biasing means could be provided, such as a gravity biasing, or the like.

In operation, the large air gap between the armature 21 and core 20 will normally prevent the transformation of substantial currents into secondary winding 12. Once, however, the current through primary winding 11 reaches a sufficiently high value the magnetic force applied to armature 21 will be sufficient to rotate it against the biasing force of spring 30 to close the air gap. Under this condition the reluctance of the core will be greatly decreased so that a substantial current may now be induced in winding 12 to cause operation of device 17 and thus operation of a circuit breaker or similar device which is to be operated when the current through coil 11 exceeds some predetermined value. It is to be specifically noted that the point of calibration at which winding 17 goes from non-current conduction to current conduction is determined solely by the mechanical bias applied to armature 21 which can be an extremely accurately determined value. Accordingly, the complete device will have a sharply defined calibration point.

Although I have described my novel invention with respect to its preferred embodiments, many variations and modifications will now be obvious to those skilled in the art, and I prefer therefore to be limited not by the specific disclosure herein but only by the appended claims.

It is claimed:

1. In combination; a circuit breaker having a current responsive trip means and a current transformer; said current transformer comprising a magnetic core forming a portion of a closed magnetic circuit, an armature core portion movable with respect to said magnetic core and being movable to a position with respect to said magnetic core to complete said closed magnetic circuit; and a primary and a secondary winding on said closed magnetic core; said primary winding being connected in series with said circuit breaker; said magnetic core portion generating a force sufficient to move said armature to said position to complete said closed magnetic circuit when the current through said primary winding exceeds a predetermined value whereupon a substantial current is generated in said secondary winding; said secondary winding being connected to said current responsive trip means.

2. A device substantially as set forth in claim 1 which further includes biasing means; said biasing means connected to said armature core portion and biasing said armature core portion away from its said position with respect to said magnetic core completing said closed magnetic core.

References Cited by the Examiner
UNITED STATES PATENTS

| | | | |
|---|---|---|---|
| 1,615,018 | 1/1927 | Langdon-Davies et al. | 323—51 X |
| 1,667,655 | 4/1928 | Clothier et al. | 317—27 X |
| 2,003,706 | 6/1935 | Bartley | 317—58 |
| 2,136,798 | 11/1938 | Lucas | 336—176 |
| 3,214,638 | 10/1965 | Moser et al. | 317—27 X |

MILTON O. HIRSHFIELD, *Primary Examiner.*

SAMUEL BERNSTEIN, STEPHEN CAPELLI,
*Examiners.*

D. YUSKO, J. D. TRAMMELL, *Assistant Examiners.*